United States Patent Office 2,860,043
Patented Nov. 11, 1958

2,860,043

METHOD OF REGULATING PLANT GROWTH

Henry Bluestone, Cleveland Heights, Ohio, assignor to Diamond Alkali Company, Cleveland, Ohio, a corporation of Delaware No Drawing. Application December 6, 1954
Serial No. 473,437

5 Claims. (Cl. 71—2.5)

This invention relates to improvements in plant growth regulating materials, and more particularly relates to improved compositions and to methods for their use.

In recent years there has been considerable use of chemicals to defoliate various plants, including, among others, cotton and soybean. Plant defoliation offers many advantages, for example, in defoliated cotton the resultant increased exposure to sun and the drying action of air movement cause mature bolls to open faster. Moreover, defoliation prevents or reduces boll rot and, in addition, retards seed and fiber deterioration.

Cotton defoliation also has the advantage of preventing difficulties heretofore caused when cotton leaves are crushed into the cotton, thereby leaving objectionable stains. Another difficulty heretofore encountered has been the problem of removing dried leaves which are carried along to the cotton gin with the bolls.

Although the defoliation of various plants is desirable when the crop is harvested by hand, since picking becomes easier and more comfortable, defoliation is particularly advantageous when mechanical pickers or harvesters are employed. Defoliated plants are free from leaves which would otherwise clog spindles of mechanical pickers or add to the trash which must be separated from the desired plant portion being harvested. In addition, when leaves are removed, the operator of the mechanical picker has a better view of the plants to be harvested and is thus able to position the picker over the plants more easily.

Various chemical compounds have been suggested heretofore and used, in some instances, on a rather large scale, in the defoliation of cotton and other plants. Typical of prior defoliants are calcium cyanamid, monosodium cyanamid, potassium cyanate, sodium chlorate, sodium dichromate, pentachlorophenol, sodium pentaborate, sodium monochloroacetate, and magnesium chlorate hexahydrate. While in many instances these defoliants have been satisfactory in leaf removal, their use has not been a complete solution to the problem of defoliation. One of the difficulties encountered generally with prior defoliants has been a general plant tissue destruction and, in many instances, the phenomenon of leaf burning with resultant leaf and plant brittleness.

Accordingly, it is the principal object of the present invention to avoid the difficulties encountered with prior defoliant compositions and to provide new and improved defoliant materials and methods for their use.

A further object of this invention is the provision of highly effective defoliant compositions which may be applied in a systemic manner or directly to plant foliage.

These and other objects and advantages will appear more fully from the description hereinafter.

As used herein, unless otherwise indicated, the term "plant" is intended to include all portions of the plant, including the roots, stems, leaves, fruits, seeds, and blossoms.

The present invention contemplates a method of modifying the normal growth and life characteristics of a plant by contacting the plant with a composition including as an active ingredient a compound characterized by the general structure

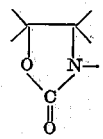

and having the following formula:

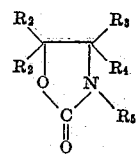

wherein $R_1$, $R_2$, $R_3$, $R_4$, and $R_5$ are the same or different radicals selected from the group consisting of hydrogen, acyl radicals, such as acetyl and benzoyl radicals; substituted or unsubstituted hydrocarbon radicals, including alkyl radicals, such as methyl, ethyl, propyl, butyl, and their isomers; aryl radicals, such as substituted or unsubstituted phenyl or naphthyl radicals; alkaryl radicals, such as tolyl or xylyl radicals; and aralkyl radicals, such as benzyl and phenethyl radicals.

Specific illustrative examples of the above type of compounds are:

2-oxazolidinone
4-methyl-2-oxazolidinone
5-methyl-2-oxazolidinone
4,4-dimethyl-2-oxazolidinone
5,5-dimethyl-2-oxazolidinone
4-ethyl-2-oxazolidinone
5-ethyl-2-oxazolidinone
4-propyl-2-oxazolidinone
4-isopropyl-2-oxazolidinone
4-butyl-2-oxazolidinone
4-hexadecyl-2-oxazolidinone
4-phenyl-2-oxazolidinone
4-tolyl-2-oxazolidinone
4-benzyl-2-oxazolidinone
hexahydro-2-benzoxazolidinone
4,5-dimethyl-2-oxazolidinone
5-acetyl-2-oxazolidinone
5-benzoyl-2-oxazolidinone Additional examples of compounds of the above type are N-substituted-2-oxazolidinones, such as the following:

3-methyl-2-oxazolidinone
3-isopropyl-5-methyl-2-oxazolidinone
3-(2-hydroxyethyl)-2-oxazolidinone
3-phenyl-2-oxazolidinone
3-(alpha-methylbenzyl)-2-oxazolidinone
3-benzyl-4,4-dimethyl-2-oxazolidinone
3-(4-chlorobenzyl)-4,4-dimethyl-2-oxazolidinone
3-cyclohexyl-5-methyl-2-oxazolidinone
5-methyl-3-(3,5,5-trimethylcyclohexyl)-2-oxazolidinone
5-methyl-3-(2-nonadecyl)-2-oxazolidinone It has been discovered that improved defoliation results when plant foliage is treated with a liquid composition of this invention by spraying, drenching, or immersing, or by contacting foliage with a powder composition embodying the invention, or by applying either a liquid or solid composition to soil around plants to be treated, the defoliant action in this instance being obtained by absorption through the plant's roots and subsequent translocation through the plant circulatory system. Such latter "systemic" action is particularly advantageous in those instances where rainfall would tend to remove defoliants applied externally to the plant foliage.

In addition to the foregoing advantages as defoliants, compositions embodying this invention also are useful in the treatment of grain crops to harden them to maturity before frost, when planted late in the season. For example, such compositions are useful in hardening to maturity an alfalfa crop planted after winter wheat of the preceding year. Another application is the treatment of nursery stock to force maturity and dormancy of the stock to provide a longer growing and harvesting season.

Synthesis of compounds useful in the practice of this invention may be accomplished by methods known to the art. For example, a convenient method of preparing these compounds involves reacting an appropriate 1,2-amino alcohol with urea. This reaction preferably is conducted at an elevated temperature, typically 115° C. or higher. It will be understood, of course, in any preparation of the active compounds employed in the practice of the present invention that a pure compound is not necessarily isolated and that purification of products generally is practicable only to the extent necessary for removing by-products and impurities which otherwise would adversely affect the reaction yield or deleteriously affect the plants to which the materials are applied. Hence, in many instances, the crude reaction product of urea and an appropriate 1,2-amino alcohol may be employed. In those cases where a purified product is required, the crude reaction mixture may be vacuum distilled, recrystallized, and/or washed, as necessary, to obtain the purity desired.

Compositions of this invention may also be embodied in dusting compounds containing carriers or fillers, such as talc, sand, dry soil, celite, kaolin, fuller's earth, kieselguhr, diatomaceous earth, chalk, gypsum, pyrophyllite, or other inorganic or organic materials, including active ingredients, such as fertilizers, insecticides, fungicides, and/or herbicides. Similarly, if a liquid drench or spray material is desired, a composition may be formulated as a liquid, using as a carrier material various solvents, diluents, extenders, and the like, such as water, aromatic and aliphatic organic liquids, such as acetone, benzene, and/or various alcohols, ethers, ketones, and the like, as well as various petroleum fractions, such materials broadly are termed "carriers" and referred to as such in the claims.

In order that those skilled in the art may better understand the practice of the present invention and in what manner it may be carried into effect, although the methods of synthesis described are not to be construed as the only suitable methods of preparation, the following examples illustrate the preparation of the compounds embodying the invention and their use as plant growth regulants in defoliant applications.

EXAMPLE I

Part A

*Preparation of 2-oxazolidinone.*—Into a 300 ml., 3-neck flask equipped with a thermometer, stirrer, and air reflux condenser are introduced 61 gms. of ethanolamine and 60 gms. of urea. Heating and stirring are continued for 2½ hours, the temperature being maintained within the range from about 135°–150° C. The crude reaction product is a clear pale yellow liquid, which is vacuum distilled to remove unreacted ethanolamine. The distilled product is dissolved in 50 ml. of hot chloroform and filtered. The filtrate is cooled to precipitate a white crystalline material, which is then washed with a small amount of cold chloroform and dried. This product is recrystallized from chloroform to obtain a product having a melting point range from 85°–90° C. and has the following analysis:

| Element | Percent Actual | Percent Calculated |
|---|---|---|
| Carbon | 41.38 | 41.4 |
| Hydrogen | 5.84 | 5.75 |
| Nitrogen | 16.06 | 16.10 |

Part B

To illustrate defoliant activity of the 2-oxazolidinone product of Part A, this product is applied to the soil around cotton plants in 4" diameter clay pots in dosages of 100, 80, 60, 40, and 20 mg. per clay pot. In 3 days, at all dosages the leaves of the cotton plants turn brown between the veins and yellow along the veins. The discoloration of the leaves continues until the 5th day, at which time substantially all of the leaves drop from the plant.

Using the product of Part A in spray application on cotton plant foliage as a 1% aqueous solution, within 6 days a substantial percentage of the leaves are defoliated.

EXAMPLE II

Part A

*Preparation of 4,4-dimethyl-2-oxazolidinone.*—Into a 300 ml., 3-neck, round-bottom flask equipped with a stirrer, thermometer, and gas sparger are introduced 89 gms. of 2-amino-2-methyl-1-propanol and 60 gms. of finely-divided urea. Stirring and heating are continued for 9½ hours at a gradually increasing temperature from 115° to 150° C. The crude reaction product is a colorless liquid, which is vacuum distilled to remove unreacted amino alcohol. The distillation product is dissolved in boiling carbon tetrachloride and cooled in ice to precipitate a white crystalline product. This product is recrystallized from carbon tetrachloride to obtain a final product having a melting point of 52° to 54° C. and the following analysis:

| Element | Percent Actual | Percent Calculated |
|---|---|---|
| Carbon | 51.87 | 52.15 |
| Hydrogen | 7.89 | 7.83 |
| Nitrogen | 11.04 | 12.18 |

Part B

To demonstrate defoliant activity of the 4,4-dimethyl-2-oxazolidinone product of Part A, experiments are conducted by applying this product to the soil around bean and cotton plants in separate 4" diameter clay pots. When applied at a dosage of 250 mg. per clay pot, in 8 days the bean plants are substantially defoliated without plant stem injury.

In a second series of tests the amounts applied to the soil around cotton plants include dosages of 100, 80, 60, 40, and 20 mg. per clay pot. In this series, within 3 days the cotton leaves are discolored and in 6 days substantially all of the leaves are defoliated.

A third series of experiments are conducted by applying the 4,4-dimethyl-2-oxazolidinone product of Part A in the form of an aqueous spray on cotton plant foliage. Within a short time, at a concentration of 1%, all of the cotton leaves are defoliated. At the lower concentration of 0.5%, 50% or more of the leaves are defoliated, there being in neither case any apparent injury to the plant.

EXAMPLE III

Part A

*Preparation of 5-methyl-2-oxazolidinone.*—Into a 300 ml., 3-neck, round-bottom flask equipped with a stirrer, thermometer, and a gas sparger are introduced 75 gms. of 1-amino-2-propanol and 60 gms. of finely-divided urea.

Stirring and heating are begun and continued for 20 hours at a temperature gradually increasing from 125° to 180° C. An orange-yellow oil crude product is obtained and vacuum distilled to remove unreacted amino alcohol. The vacuum distillation product is a colorless oil melting at 20°-22° C., having a refractive index at 24.5° C. of $n_{14.5°}D$ 1.4590 and has the following analysis:

| Element | Percent Actual | Percent Calculated |
|---|---|---|
| Carbon | 47.31 | 47.5 |
| Hydrogen | 6.975 | 6.97 |
| Nitrogen | 12.3 | 13.85 |

Part B

To indicate defoliant activity, a series of experiments are conducted by applying the 5-methyl-2-oxazolidinone product of Part A to soil around bean plants in 4" diameter clay pots at a dosage of 250 mg. per clay pot. After 8 days, there is observed a substantial defoliation without injury to the plant stems.

A second series of soil application experiments are conducted using the 5-methyl-2-oxazolidinone product of Part A in applications to soil around cotton plants. At dosages of 100, 80, 60, 40, and 20 mg. per 4" diameter clay pot, a substantial defoliation of the cotton plants is observed at each dosage.

To illustrate effectiveness of foliage application, experiments are conducted using the 5-methyl-2-oxazolidinone product of Part A in the form of a 1% aqueous solution applied to the cotton plant foliage. After 6 days all of the leaves on the plants are defoliated.

EXAMPLE IV

*Preparation of 4-ethyl-2-oxazolidinone.*—Into a 300 ml., 3-neck, round-bottom flask, equipped with a thermometer, stirrer, and gas outlet tube, are introduced 89 gms. of 2-amino-1-butanol and 60 gms. of urea. This mixture is heated for a period of 8 hours at a temperature gradually increasing from 125° C. to 165° C. The resultant orange-yellow oil crude product is vacuum distilled twice to obtain a yellow oil having a boiling point range of 119° to 126° C. and a refractive index of $n_{26°}D$ of 1.4620. Chemical analysis of the distillation product indicates the following composition:

| Element | Percent Actual | Percent Calculated |
|---|---|---|
| Carbon | 47.31 | 47.50 |
| Hydrogen | 6.97 | 6.97 |
| Nitrogen | 12.3 | 13.85 |

This 4-ethyl-2-oxazolidinone product is characterized by plant growth regulant activity similar to that exhibited by the compounds prepared according to the preceding examples.

The foregoing examples are illustrative of applications both of a systemic nature and of a direct foliage treatment but, of course, are not to be construed as limiting the invention. It will now be understood that compounds within the scope of this invention may be utilized in a direct manner, as by spraying, sprinkling, or drenching plant foliage with a solution, emulsion, slurry, or other liquid containing such compounds, or by dusting plant foliage with a dry material containing one of the foregoing compounds. It will also be understood, of course, that compounds and compositions embodying the invention are effective when applied to the soil around plants to be defoliated. The term "soil," as used herein, is intended to include any substance or medium capable of supporting the growth of plants. It is therefore intented to include, in addition to soil, humus, manure, compost, sand, and artificially created plant growth media, including solutions and/or other hydroponic media.

A particular advantage of compounds and compositions embodying the present invention is that in most instances the compounds are readily water-soluble. This advantage is a substantial one, since the preparation and utilization of solutions, slurries, emulsions, wettable mixtures and the like is facilitated. While this increased solubility and/or rate of solubility is highly advantageous, and in many instances renders unnecessary the use of any so-called wetting agent or surface active agent. However, in some instances, it is desirable to incorporate a small amount of a wetting agent or surface active agent in compositions embodying the invention. Illustrative of suitable wetting agents are the following commercially available products: Igepal CO-880 (alkyl phenoxypolyoxyethylene ethanol), Arquad 2-C (quaternary ammonium compound of the formula $RR'-N-(CH_3)_2Cl$), Emulphor ON-870 (polyoxyethylated fatty alcohol), Tween 80 (polyoxyethylene sorbitan monooleate), Triton X-155 (alkyl aryl polyether alcohol), Trem 615 (polyhydric alcohol ester), Tween 85 (polyoxyethylene sorbitan trioleate), Nonic 218 (polyethylene glycol tertdodecyl thioether), Santomerse D (decyl benzene sodium sulfonate), Pluronic F-68 (condensate of ethylene oxide with an hydrophobic base formed by condensing propylene oxide with propylene glycol), Antarox A-400 (alkyl phenoxypolyoxyethylene ethanol), Triton X-120 (alkyl aryl polyether alcohol), Nacconol NRSF (alkyl aryl sulfonate), Aresol OS (isopropyl naphthylene sodium sulfonate), Span 40 (sorbitan monopalmitate), Triton B-1956 (modified phthalic glycerol alkyd resin), and Antarox B-290 (polyoxyethylated vegetable oil).

It will be appreciated by those skilled in the art that the best formulation to be employed in a specific application depends upon a number of factors. However, those skilled in the art will also recognize that the present invention contemplates the use of compositions in which compounds are employed as wettable powders with or without diluents and/or extenders or other active or inactive ingredients, including such substances as insecticides or other plant-treating agents.

It is to be understood that although the invention has been described with specific reference to particular embodiments thereof, it is not to be so limited, since changes and alterations therein may be made which are within the full intended scope of this invention as defined by the appended claims.

What is claimed is:

1. A method of treating plants which comprises contacting said plants with a plant growth regulating amount of a compound having the formula:

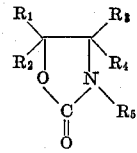

wherein $R_1$, $R_2$, $R_3$, $R_4$, and $R_5$ are selected from the group consisting of hydrogen, acetyl, benzoyl, alkyl radicals containing from 1 to 19 carbon atoms, aryl, alkaryl, aralkyl radicals and a carrier, wherein said alkaryl and aralkyl radicals contain from 1 to 4 carbon atoms in the alkyl substituent.

2. A method of defoliating plants which comprises contacting said plants with a plant growth regulating amount of a compound having the formula:

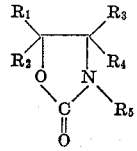

wherein $R_1$, $R_2$, $R_3$, $R_4$, and $R_5$ are selected from the group consisting of hydrogen, acetyl, benzoyl, alkyl radicals containing from 1 to 19 carbon atoms, aryl, alkaryl, and aralkyl radicals, wherein said alkaryl and aralkyl radicals contain from 1 to 4 carbon atoms in the alkyl substituent.

3. The method of treating plants which comprises contacting said plants with a plant growth regulating amount of a compound having the formula:

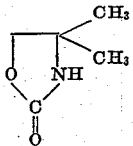

4. The method of treating plants which comprises contacting said plants with a plant growth regulating amount of a compound having the formula:

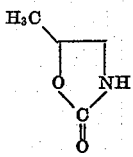

5. The method of treating plants which comprises contacting said plants with a plant growth regulating amount of a compound having the formula:

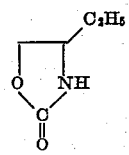

References Cited in the file of this patent
UNITED STATES PATENTS

| | | |
|---|---|---|
| 2,399,118 | Homeyer | Apr. 23, 1946 |
| 2,656,328 | Caldwell | Oct. 20, 1953 |
| 2,755,286 | Bell et al. | July 17, 1956 |

OTHER REFERENCES

"Agriculture Handbook," No. 69, U. S. Dept. of Agriculture, May 1954, page 250.

UNITED STATES PATENT OFFICE
Certificate of Correction

Patent No. 2,860,043                                  November 11, 1958

Henry Bluestone

It is hereby certified that error appears in the printed specification of the above numbered patent requiring correction and that the said Letters Patent should read as corrected below.

Column 2, lines 14 to 16, left-hand portion of the formula, for $$\begin{array}{c}R_2\\ \Large> \\ R_3\end{array} \quad \text{read} \quad \begin{array}{c}R_2\\ \Large> \\ R_1\end{array}$$

column 5, line 7, for "$n_{14.5}\cdot D$" read —$n_{24.5}\cdot D$—.

Signed and sealed this 31st day of March 1959.

[SEAL]

Attest:
KARL H. AXLINE,
*Attesting Officer.*

ROBERT C. WATSON,
*Commissioner of Patents.*